(12) United States Patent
Stringham

(10) Patent No.: US 8,732,417 B1
(45) Date of Patent: May 20, 2014

(54) TECHNIQUES FOR CREATING SNAPSHOTS OF A TARGET SYSTEM

(75) Inventor: Russell R. Stringham, Orem, UT (US)

(73) Assignee: Symantec Corporation, Mountain View, CA (US)

( * ) Notice: Subject to any disclaimer, the term of this patent is extended or adjusted under 35 U.S.C. 154(b) by 773 days.

(21) Appl. No.: 12/252,071

(22) Filed: Oct. 15, 2008

(51) Int. Cl.
*G06F 12/00* (2006.01)
*G06F 13/00* (2006.01)
*G06F 13/28* (2006.01)

(52) U.S. Cl.
USPC .................................. 711/162; 711/E12.103

(58) Field of Classification Search
USPC .......................................... 711/162, E12.103
See application file for complete search history.

(56) References Cited

U.S. PATENT DOCUMENTS

| | | | |
|---|---|---|---|
| 5,649,152 A * | 7/1997 | Ohran et al. | 711/114 |
| 5,835,953 A * | 11/1998 | Ohran | 711/162 |
| 6,182,198 B1 * | 1/2001 | Hubis et al. | 711/162 |
| 6,434,681 B1 * | 8/2002 | Armangau | 711/162 |
| 6,784,504 B2 * | 8/2004 | Derderian et al. | 257/396 |
| 6,820,099 B1 * | 11/2004 | Huber et al. | 707/649 |
| 6,912,630 B1 * | 6/2005 | Pillai et al. | 711/162 |
| 6,981,114 B1 * | 12/2005 | Wu et al. | 711/162 |
| 7,546,431 B2 * | 6/2009 | Stacey et al. | 711/165 |
| 7,870,356 B1 * | 1/2011 | Veeraswamy et al. | 711/162 |
| 8,082,407 B1 * | 12/2011 | Chatterjee et al. | 711/162 |
| 8,099,572 B1 * | 1/2012 | Arora et al. | 711/162 |
| 8,260,744 B1 * | 9/2012 | Chatterjee et al. | 707/639 |
| 8,515,911 B1 * | 8/2013 | Zhou et al. | 707/638 |
| 2002/0112134 A1 * | 8/2002 | Ohran et al. | 711/162 |
| 2003/0158798 A1 * | 8/2003 | Green | 705/30 |
| 2005/0065962 A1 * | 3/2005 | Rowan et al. | 707/102 |
| 2005/0120359 A1 * | 6/2005 | Shoji et al. | 719/321 |
| 2005/0138312 A1 * | 6/2005 | Kubo et al. | 711/162 |
| 2005/0182799 A1 * | 8/2005 | Hitz et al. | 707/202 |
| 2005/0246397 A1 * | 11/2005 | Edwards et al. | 707/204 |
| 2006/0089953 A1 * | 4/2006 | Chen et al. | 707/202 |
| 2006/0179261 A1 * | 8/2006 | Rajan | 711/162 |
| 2006/0206536 A1 * | 9/2006 | Sawdon et al. | 707/200 |
| 2006/0212481 A1 * | 9/2006 | Stacey et al. | 707/104.1 |
| 2007/0174669 A1 * | 7/2007 | Ebata et al. | 714/6 |
| 2007/0294495 A1 * | 12/2007 | Uchida et al. | 711/162 |
| 2010/0030959 A1 * | 2/2010 | Satoyama et al. | 711/112 |

* cited by examiner

*Primary Examiner* — Sheng-Jen Tsai
(74) *Attorney, Agent, or Firm* — Wilmer Cutler Pickering Hale and Dorr LLP

(57) ABSTRACT

Techniques for creating snapshots of a target system are disclosed. In one particular exemplary embodiment, the techniques may be realized as an apparatus for creating snapshots of a target system comprising a module for tracking modifications to a target system after a given time, a module for storing information from the target system in a read-only snapshot and a writable snapshot, and a module for modifying the writable snapshot after the given time.

20 Claims, 7 Drawing Sheets

TECHNIQUES FOR CREATING SNAPSHOTS OF A TARGET SYSTEM

FIELD OF THE DISCLOSURE

The present disclosure relates generally to generating snapshots and, more particularly, to techniques for creating snapshots of a target system.

BACKGROUND OF THE DISCLOSURE

A backup of a system at a given time may use a snapshot to create one or more files that may be used to re-create the system as it existed at the given time. A continuous data protection ("CDP") system may be used to reduce overall backup file size by capturing only system modifications that occur after the snapshot is created. CDP may also be used to provide access to versions of files as they existed between backups. For example, if a snapshot is taken at a time t0, and only file file1.dat is modified between time t0 and time t1, then a CDP system typically captures only the modifications to file1.dat. The system may be restored as it existed at time t1 by restoring the system to the time t0 snapshot, and then adding any modification made to file file1.dat to arrive at the image of the system as it existed at time t1. For a CDP system to work, however, the snapshots that are taken cannot be modified after they are created, since the modifications between snapshots are captured in the CDP system, and the snapshots themselves relate to the state of the system at the time they are taken.

Some applications or filesystems, however, may desire a snapshot that can be later modified to allow for a better restoration at a later time. For example, databases may not be able to copy log files to a snapshot at the time the snapshot is created. Database software may flush the log files when the snapshot is created, and the log files may be applied to the snapshot after the snapshot is created. The log files may be required for an adequate system restoration, so the log files may be a necessary or otherwise desirable addition to the snapshot. After other applications have applied writes that they may require to the snapshot, the snapshot may be placed in a read-only state, and a backup operation may be performed.

A system which utilizes, for example, a CDP system and requires that snapshots be writable after they are created, may result in corrupt snapshots for the CDP system if the snapshots are writable. However, a system which creates only read-only snapshots for a CDP system may not be able to utilize a post-snapshot modification system as described above.

In view of the foregoing, it may be understood that there are significant problems and shortcomings associated with current snapshot backup and restoration technologies.

SUMMARY OF THE DISCLOSURE

Techniques for creating snapshots of a target system are disclosed. In one particular exemplary embodiment, the techniques may be realized as an apparatus for creating snapshots of a target system comprising a module for tracking modifications to a target system after a given time, a module for storing information from the target system in a read-only snapshot and a writable snapshot, and a module for modifying the writable snapshot after the given time.

In accordance with other aspects of this particular exemplary embodiment, the apparatus may further comprise a module to track modifications to the writable snapshot after the given time.

In accordance with further aspects of this particular exemplary embodiment, the module for tracking modifications to the target system may record the modifications to the target system in one or more electronic files.

In accordance with additional aspects of this particular exemplary embodiment, the apparatus may further comprise a module to create a full backup from the read-only snapshot or the writable snapshot, wherein the full backup may comprise a full backup of the target system.

In accordance with other aspects of this particular exemplary embodiment, the apparatus may further comprise a module to create an incremental backup from the read-only snapshot or the writable snapshot, wherein the incremental backup may comprise an incremental backup of the target system relative to a backup of a previous snapshot.

In accordance with further aspects of this particular exemplary embodiment, the apparatus may further comprise a restoration module, wherein the restoration module may restore the target system to the state of the writable snapshot.

In accordance with additional aspects of this particular exemplary embodiment, the restoration module may use the read-only snapshot or a backup of the read-only snapshot as a starting point for replaying the file system modifications captured by a continuous data protection module to reconstruct the state of a file as it existed on the target system at a time after the given time.

In accordance with additional aspects of this particular exemplary embodiment, the apparatus may further comprise a module to create an incremental backup from the read-only snapshot or the writable snapshot, wherein the incremental backup may comprise an incremental backup of the target system relative to the other snapshot created by the apparatus at the same time.

In another particular exemplary embodiment, the techniques may be realized as a method for creating snapshots of a target system comprising the steps of tracking modifications to a target system after a given time, storing information from the target system in both a read-only snapshot and a writable snapshot, and modifying the writable snapshot after the given time.

In accordance with other aspects of this particular exemplary embodiment, at least one processor readable medium for storing a computer program of instructions configured to be readable by at least one processor for instructing the at least one processor to execute a computer process for performing the method may be provided.

In accordance with further aspects of this particular exemplary embodiment, tracking modifications to the target system may comprise recording a list of blocks modified by the target system.

In accordance with additional aspects of this particular exemplary embodiment, the method may further comprise creating an incremental backup by utilizing the list of blocks modified by the target system to determine the blocks to be captured from the snapshot to comprise the incremental backup In accordance with other aspects of this particular exemplary embodiment, the method may further comprise applying the changes captured in the one or more computer files to a backup of the read-only snapshot to recover one of more files to how it existed at some point after the snapshot.

In accordance with further aspects of this particular exemplary embodiment, tracking modifications to the target system may comprise recording the modifications to the target system in one or more computer files.

In accordance with additional aspects of this particular exemplary embodiment, the method may further comprise storing a full backup, wherein a full backup may be created from the read-only snapshot or the writable snapshot and may comprise a full backup of the target system.

In accordance with additional aspects of this particular exemplary embodiment, the method may further comprise creating an incremental backup from the read-only snapshot or the writable snapshot, wherein the incremental backup may comprise an incremental backup of the target system relative to a backup of a previous snapshot.

In accordance with additional aspects of this particular exemplary embodiment, the method may further comprise creating an incremental backup from the read-only snapshot or the writable snapshot, wherein the incremental backup may comprise an incremental backup of the target system relative to the other snapshot created by the method at the same time.

In accordance with additional aspects of this particular exemplary embodiment, the method may further comprise restoring the target system to the state of the writable snapshot.

In accordance with additional aspects of this particular exemplary embodiment, the method may further comprise using the read-only snapshot as a starting point for replaying modifications to the target system to reconstruct the state of a file as it existed on the target system sometime after the given time.

In another particular exemplary embodiment, the techniques may be realized as an article of manufacture for creating snapshots of a target system, the article of manufacture comprising at least one processor readable medium, and instructions carried on the at least one medium, wherein the instructions are configured to be readable from the at least one medium by at least one processor and thereby cause the at least one processor to operate so as to track modifications to a target system after a given time, store information from the target system in both a read-only snapshot and a writable snapshot, and modify the writable snapshot after the given time.

The present disclosure will now be described in more detail with reference to exemplary embodiments thereof as shown in the accompanying drawings. While the present disclosure is described below with reference to exemplary embodiments, it should be understood that the present disclosure is not limited thereto. Those of ordinary skill in the art having access to the teachings herein will recognize additional implementations, modifications, and embodiments, as well as other fields of use, which are within the scope of the present disclosure as described herein, and with respect to which the present disclosure may be of significant utility.

BRIEF DESCRIPTION OF THE DRAWINGS

In order to facilitate a fuller understanding of the present disclosure, reference is now made to the accompanying drawings, in which like elements are referenced with like numerals. These drawings should not be construed as limiting the present disclosure, but are intended to be exemplary only.

FIG. 3b shows an exemplary set of backups of the snapshots from time t1 in accordance with an embodiment of the present disclosure, where the relationship of the backups is altered from the relationship of the snapshots shown in FIG. 3a.

DETAILED DESCRIPTION OF EXEMPLARY EMBODIMENTS

Figure 1:
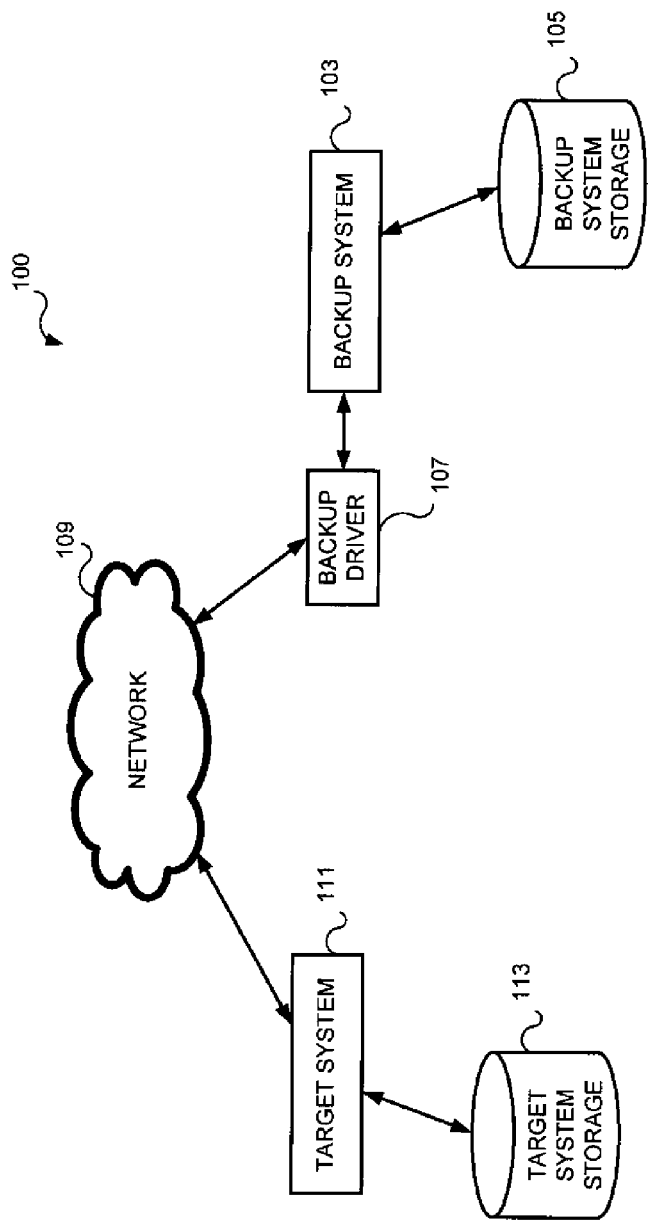
FIG. 1 shows an exemplary diagram of a system comprising a target system and a backup system in accordance with an embodiment of the present disclosure.

Referring to FIG. 1, there is shown an exemplary diagram of a system 100 comprising target system 111 and a backup system 103 in accordance with an embodiment of the present disclosure. The target system 111 may be a physical device, such as a computer or computerized server, commonly known in the art. The target system 111 may receive data from one or more inputs, produce data through one or more outputs, have one or more target system storage devices 113 for storing and retrieving data, and be in communication with one or more networks 109. The target system 111 may operate using an operating system, and may load the operating system into memory from local persistent storage, for example a hard drive, or may load the operating system into memory from shared persistent storage across the one or more networks 109. The target system 111 may comprise one or more computerized systems. For example, the target system 111 may comprise a cluster of physical systems interoperating through the one or more networks 109 or other connections.

The target system storage 113 may include local persistent storage, for example one or more magnetic, optical, or solid state memory configurations. Alternatively, the target system storage 113 may include a server or a group of servers that control one or more persistent storage devices. The persistent storage devices may include, for example, hard disk drives, tape drives, random access memory, read-only memory, or any other kind of device to store and recall information as is known in the art. The target system storage 113 may be operably connected to the one or more networks 109, or may be in communication with the target system 111 to receive and transmit data. The target system storage 113 may be operable to receive requests from the one or more networks 109, and to transmit data across the one or more networks 109. The target system storage 113 may also be operable to receive requests from the target system 111 across a dedicated or shared link between the target system storage 113 and the target system 111, and to transmit data to the target system 111 across the dedicated or shared link.

The backup system 103 may be similar to the target system 111, and may be a physical device, such as a computer or computerized server, commonly known in the art. The backup system 103 may receive data from one or more inputs, produce data through one or more outputs, have one or more backup system storage devices 105 for storing and retrieving data, and be in communication with the one or more networks 109. The backup system 103 may operate using an operating system, and may load the operating system into memory from local persistent storage, for example a hard drive, or may load the operating system into memory from shared persistent storage across the one or more networks 109. The backup system 103 may comprise one or more computerized systems. For example, the backup system 103 may comprise a cluster of physical systems interoperating through the one or more networks 109 or other connections. In another embodiment, the backup system 103 and the target system 111 may operate on the same system or group of systems.

The backup system storage 105 may include local persistent storage, for example one or more magnetic, optical, or solid state memory configurations. Alternatively, the backup system storage 105 may include a server or a group of servers that control one or more persistent storage devices. The persistent storage devices may include, for example, hard disk drives, tape drives, random access memory, read-only memory, or any other kind of device to store and recall information as is known in the art. The backup system storage 105 may be operably connected to the one or more networks 109, or may be in communication with the backup system 103 to receive and transmit data. The backup system storage 105 may be operable to receive requests from the one or more networks 109, and to transmit data across the one or more networks 109. The backup system storage 105 may also be operable to receive requests from the backup system 103 across a dedicated or shared link between the backup system storage 105 and the backup system 103, and to transmit data to the backup system 103 across the dedicated or shared link. In some embodiments of this system, backup system storage 105 and target system storage 113 may share some or all of their storage devices.

A backup driver 107 may be software operating on the backup system 103 or the target system 111, or may be encoded in hardware operating with the backup system 103. The backup driver 107 may be operable to request data from the target system 111 and create one or more snapshots of the target system 111 or the target system storage 113. The backup driver 107 may also be operable to transmit the data from the target system 111 to the backup system 103. The backup driver 107 may create a full backup or an incremental backup. A full backup may be a full image of the target system 111 or portion thereof at a given time. An incremental backup may capture one or more files, partial files, sectors, clusters or similar data blocks that have been modified since a last full or incremental backup. In order to create snapshots and/or incremental backups, the backup driver 107 may be operable to intercept all of the modifications made by the target system 111 to the target system storage 113 (for example, by copying the write commands from the target system 111 to the target storage system 113, or through another mechanism to observe the modifications made to the target system storage 113). The backup driver 107 may consist of two independent drivers, one that provides snapshot functionality, and one that provides modification-tracking functionality. A third driver may also be used for CDP tracking.

A backup of a snapshot (not depicted in FIG. 1) may be contained within one or more files. The one or more files may be operable to reconstruct, in whole or in part, all or a portion of the target system storage 113. One or more backups of snapshots may be created and stored by the backup system 103 within the backup system storage 105. The snapshots may be read-only or writable. The files contained within a read-only snapshot may not be modified after the read-only snapshot's creation. The files contained within a writable snapshot may be able to be modified after its creation. The backup driver 107 may be operable to "lock" or "close" a writable snapshot, making it read-only after a period of time and preventing further modifications to the snapshot. The backup driver 107 may also be operable to "unlock" or "open" a read-only snapshot, making it writable.

The one or more networks 109 may include, but are not limited to, for example, wide area networks (WAN), local area networks (LAN), global networks such as the Internet, telephone networks such as a public switch telephone network, wireless communication networks, cellular networks, storage networks such as fibre channel networks, intranets, or the like, or any combination thereof. Also, the one or more networks may be used so that components of the present disclosure may be in communication with one another. In exemplary embodiments of the disclosure, the one or more networks 109 may include one or any number of the exemplary types of networks mentioned above operating as standalone networks or in cooperation with each other. Use of the term network herein is not intended to be limited to a single network.

Figure 2:
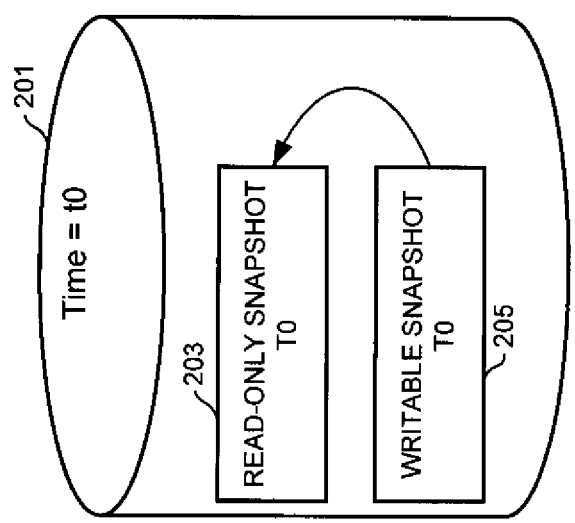
FIG. 2 shows an exemplary set of snapshots at time t0 in accordance with an embodiment of the present disclosure.

Referring now to FIG. 2, there is shown an exemplary set of snapshots 201 at time t0 in accordance with an embodiment of the present disclosure. As described with respect to FIG. 1, the target system 111 may be operable to create and store one or more snapshots of a portion or all of the target system storage 113. The target system 111 may store two or more snapshots of the target system storage 113 at a particular time. In the example shown in FIG. 2, at a time t0, the backup driver 107 instructs the target system 111 to create a snapshot of the target system storage 113. The target system 111 stores the snapshot as both a writable snapshot 205 and a read-only snapshot 203. Files contained within the read-only snapshot 203 may not be able to be modified after time t0, and the files contained within the writable snapshot 205 may be able to be modified after the snapshot is created.

The writable snapshot 205 and read-only snapshot 203 initially may be identical, but may diverge after modifications are made to the writable snapshot 205. The backup driver 107 may track or record which sectors or clusters are modified within the target system storage 113. If the backup driver 107 detects a write to the target system storage 113, which has not been modified since the snapshot was taken, the backup driver 107 may copy the sector or cluster that is to be modified to a separate location before allowing the write to modify the original sector or cluster. The backup driver 107 may also create a pointer to the old, unmodified copy of the sector or cluster and the newly modified sector or cluster. The backup driver 107 may also maintain a list of pointers, corresponding to the unmodified original sectors or clusters and the newly modified sectors or clusters that take place after a snapshot is created. The separate location may be space allocated in a file created for the purpose of storing old and unmodified sectors or clusters, or it may be allocated on a dedicated volume. The backup driver 107 may also simply relocate these sectors or clusters to unallocated space within the target system storage 113. This process may be known as a "copy on write" operation.

The backup driver 107 may only track old and new sectors or clusters when the sector or cluster of the target system storage 113 that is being written to was used by the file system at the time the snapshot was taken. If a previously unallocated sector or cluster is used, either to create a new file or to extend an existing file, the backup driver 107 may not capture the old sector or cluster, as the old sector or cluster may not have held relevant data, or any data at all.

To implement a writeable snapshot, when a write command implicates a data block in the writable snapshot, the backup driver 107 may check to see if the data block was previously relocated (i.e., because it has also been modified in the target system's 111 file system or because it was previously modified in the writeable snapshot). If not, the backup driver 107 allocates space in a relocation area and defines a relocation pointer for the implicated data block. The data is then written to this relocation area.

Applications or programs residing on the target system 111 or modifying files on the target system storage 113 may modify the writable snapshot. For example, applications or programs may modify log files in the writable snapshot. The backup driver 107 may track which blocks of the writable snapshot were modified. The backup driver 107 may track modifications to the writable snapshot in a manner similar to the modification tracking of the target system storage 113. After relevant modifications to the writable snapshot 205 are completed, the target system 111, the backup system 103, or the backup driver 107 may signal that the writable snapshot 205 may be closed or made read-only. The writable snapshot 205 may also be made read-only after a period of time. The writable snapshot 205 may contain a reference or pointer to the read-only snapshot 203 at time t0, for use if the writable snapshot 205 and the read-only snapshot 203 are backed up, and may also include a list of modifications that have occurred within the writable snapshot 205 relative to the read-only snapshot 203. This modification list may also be a list of changes that have occurred to the writable snapshot 205 since the writable snapshot 205 was created at time t0.

Assuming that the backup at time t0 is a full backup, a backup of the read-only snapshot 203 may be performed, as that was the state of the target system 111 as of time t0. Since the backup driver 107 tracked the modifications made to the writable snapshot 205 from time t0 (when the writable snapshot 205 was identical to the read-only snapshot), the modifications made to the writable snapshot 205 may be backed up as an incremental backup to the backup of the read-only snapshot 203 between time t0 and the time the writable snapshot 205 was closed. If no sectors or clusters modified between the read-only snapshot 203 and the writable snapshot 205, then the incremental backup would not capture any modifications and would thus have a zero size or be very small.

Figure 3A:
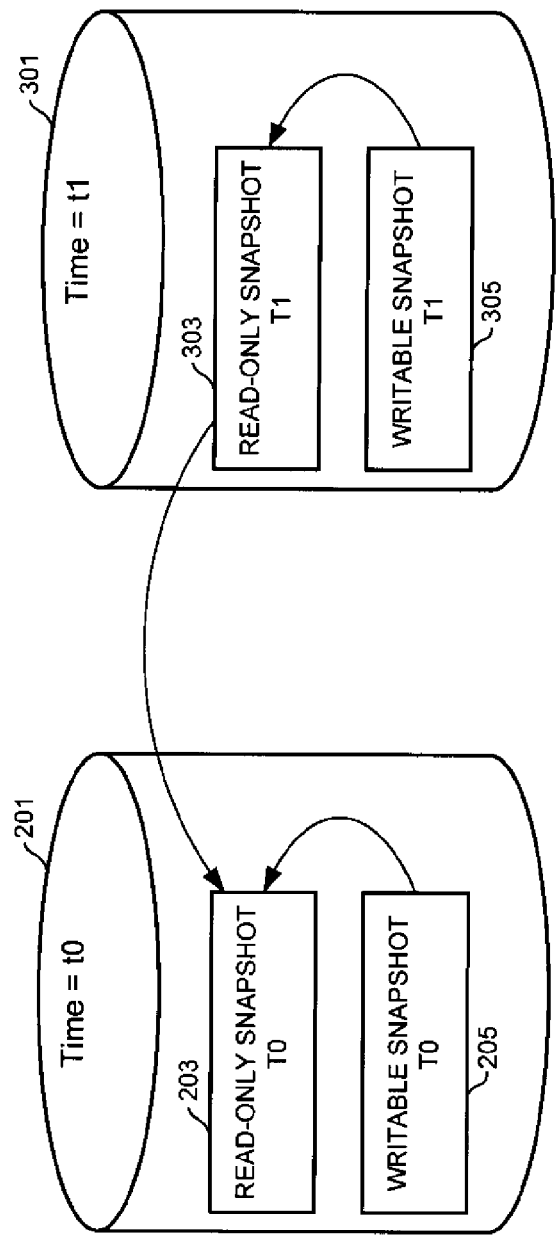
FIG. 3a shows an exemplary set of backups of the snapshots at time t1 in accordance with an embodiment of the present disclosure.

Referring now to FIG. 3a, in addition to the snapshots 201 at time t0, there is shown an exemplary set of snapshots 301 at time t1 in accordance with an embodiment of the present disclosure. An incremental backup may be created at time t1. Time t0 and time t1 may be any discrete time interval apart from one another. For example, and without limitation, the difference between time t0 and time t1 may be on the order of milliseconds, seconds, minutes, or hours. The time interval may be limited only by the operation of the system 100 and/or the amount of available memory and/or storage of the target system 111 and/or backup system 103.

The incremental backup may be based on a read-only snapshot 303 and a writable snapshot 305. The read-only snapshot 303 incremental backup may capture modifications made to the target system 111 since a last full or incremental backup. In this case, the read-only snapshot 303 incremental backup may capture modifications made to the target system 111 since time t0. If there have been no modifications to the target system 111 since time t0, then the incremental backup of the read-only snapshot 303 may not capture any modifications and the incremental backup of the read-only snapshot 303 may have a zero size or be very small.

The incremental backup of the read-only snapshot 303 may reference as a "parent" a most recent incremental or full backup of a read-only snapshot. For example, the incremental backup of the read-only snapshot 303 created at time t1 may reference the incremental backup of the read-only snapshot 203 and/or the full backup of the read-only snapshot created at time t0. Thus, the incremental backup of read-only snapshot 303 may only contain modifications that happened to the target storage system 113 since the previous read-only snapshot 203. A system restoration of the target system 111 as it existed at time t1 may then begin with the last read-only snapshot backup that was taken, in this case the backup of read-only snapshot 303 at time t1, and may continue by restoring the remainder of the system data contained in the incremental backup of read-only snapshot 203. In this case, a restoration of the target system 111 to time t1 would begin with the incremental backup of read-only snapshot 303 at time t1. The backup system 103 may then determine all blocks or sectors that were allocated by the target system's 111 file system at time t1. For each of the blocks or sectors in the file system, the backup system 103 checks the most recent incremental backup for the sector or block. If the sector or block is not found, then the backup system 103 checks the immediately previous incremental backup for the sector or block, if other incremental backups exist which occurred after a full backup, and continues checking previous incremental backups until the sector or block is found in one of the incremental backups, or the sector or block is found in the full backup.

The writable snapshot 305 may be created at time t1, and applications or programs may modify the writable snapshot 305 until the writable snapshot 305 is made read-only. The backup driver 107 may track the modifications made to the writeable snapshot 305 after the read-only snapshot 303 at time t1 is created. After relevant modifications to the writable snapshot 305 are completed, the target system 111, the backup system 103 or the backup driver 107 may signal that the writable snapshot 305 may be closed or made read-only. The writable snapshot 305 may contain a reference or pointer to the read-only snapshot 303 at time t1, for use if the writable snapshot 305 and the read-only snapshot 303 are backed up. If the writable snapshot 305 is backed up, it may be an incremental backup to a backup of read-only snapshot 303, capturing the changes that happened to the writable snapshot 305 since time t1.

Figure 3B:
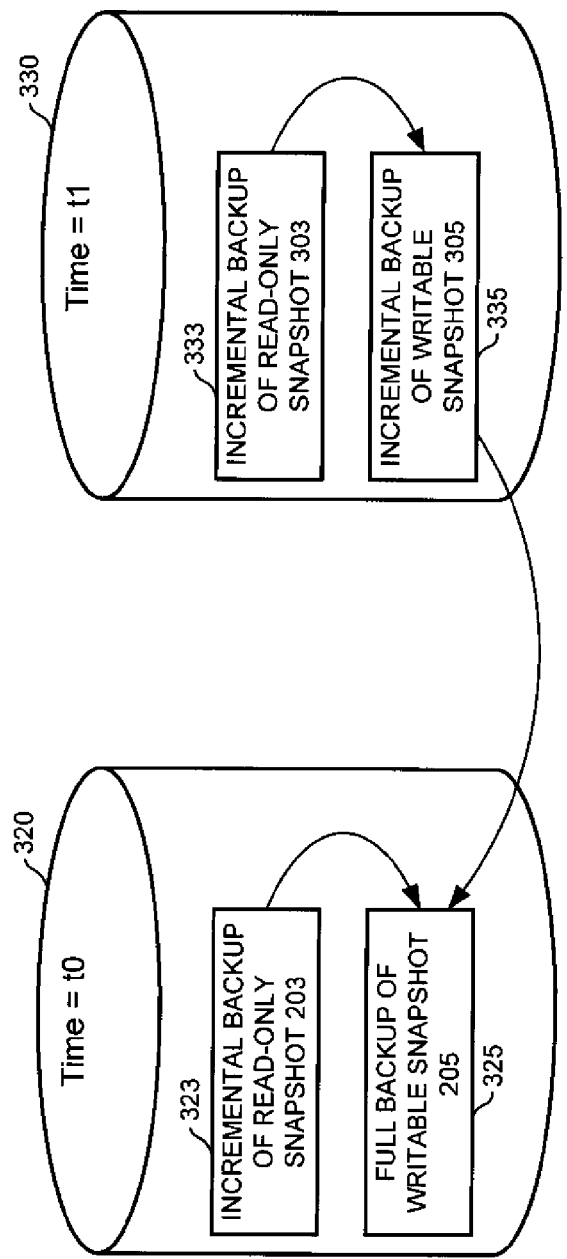

Referring now to FIG. 3b, there is shown an exemplary set of snapshot backups at time t0 320 and an exemplary set of snapshot backups at time t0 330 in accordance with another embodiment of the present disclosure. The writable snapshots in FIG. 3b operate similarly to the writable snapshots in FIG. 3a, and the read-only snapshots in FIG. 3b operate similarly to the read-only snapshots in FIG. 3a. However, the relationship of the snapshots in FIG. 3b may differ from the relationship of the snapshots in FIG. 3a.

More specifically, referring to FIG. 3b, a full backup may be created at time t0. The full backup at time t0 may have a read-only snapshot 203 and a writable snapshot 205. A backup 325 of the writable snapshot 205 may constitute a full backup of the target system 111 at the time the writable snapshot 205 is made read-only. The backup driver 107 may track the modifications made to the writeable snapshot 205 after time t0 and until the writable snapshot 205 is made read-only. The read-only snapshot 203 may thus constitute the information as it existed at time t0, if that information was changed on the target system 111 between time t0 and the time the writable snapshot 205 was made read-only. An incremental backup 323 of read-only snapshot 203 relative to the backup 325 of the writable snapshot 205 can be made by capturing all sectors or blocks in the read-only snapshot 205 that were modified in the writable snapshot. Therefore, application of the changes in the backup of the read-only snapshot 323 to the backup of the writable snapshot 325, may reconstitute the target system to its state at time t0.

An incremental backup may be created at time t1. The incremental backup may have a read-only snapshot 303 and a writable snapshot 305. Applications or programs may modify the writable snapshot 305 until the writable snapshot 305 is made read-only. The backup driver 107 may track the modifications made to the writeable snapshot 305 after the read-only snapshot 303 at time t1 is created. After relevant modifications to the writable snapshot 305 are completed, the target system 111, the backup system 103 or the backup driver 107 may signal that the writable snapshot 305 may be closed or made read-only.

An incremental backup 335 of writable snapshot 305 may capture modifications made to the target system 111 since a last full or incremental backup, i.e. since the backup 325 of the writable snapshot 205 from time t0. In this case, the writable snapshot 305 incremental backup 325 may capture modifications made to the target system 111 since time t0, including those made in writable snapshots 205 and 305. If there have been no modifications to the target system 111 or the writeable snapshots 205 or 305 since time t0, then the incremental backup 335 of the writable snapshot 305 may not capture any modifications and the incremental backup 335 of the writable snapshot 305 may have a zero size or be very small.

A backup 333 of the read-only snapshot 303 may contain a reference or pointer to the backup 335 of the writable snapshot 305 at time t1. If the read-only snapshot 303 is backed up, it may be an incremental backup to a backup 335 of writable snapshot 305, reverting the changes that accumulated while the writable snapshot 305 was modified, but before it was made read-only.

The incremental backup 335 of the writable snapshot 305 may reference as a "parent" the most recent previous writable snapshot, in FIG. 3b, the full backup 325 of the writable snapshot 205 created at time t0. Thus, the incremental backup 335 of writable snapshot 305 may only contain modifications that happened to the target storage system 113 since the previous writable snapshot 205, including modifications that happened to writable snapshots 205 and 305. An incremental backup 333 of the read-only snapshot 305 may only capture the changes between the writable snapshot 305 and the read-only snapshot 303 at time t1.

A system restoration of the target system 111 as it existed at time t1 may then begin with the last writable snapshot backup that was taken, in this case the backup 335 of writable snapshot 305 at time t1, and may continue by restoring the remainder of the system data contained in the full backup 325 of writable snapshot 205. In this case, a restoration of the target system 111 to time t1 would begin with the incremental backup 335 of the writable snapshot 305 at time t1. The backup system 103 may then determine all blocks or sectors that were allocated by the target system's 111 file system at time t1. For each of the blocks or sectors in the file system, the backup system 103 checks the most recent incremental backup for the sector or block. If the sector or block is not found, then the backup system 103 checks the immediately previous incremental backup for the sector or block, if other incremental backups exist which occurred after a full backup, and continues checking previous incremental backups until the sector or block is found in one of the incremental backups, or the sector or block is found in the full backup. The system is thus restored based on the filesystem as it existed before the writable snapshot 305 at t1 was closed. The backup system 103 may then apply the changes between the writable snapshot 305 at time t1 and the read-only snapshot 303 at time t1 that have been captured in incremental backup 333 to restore the system to the filesystem as it existed at the read-only snapshot 305 at time t1.

Figure 4:
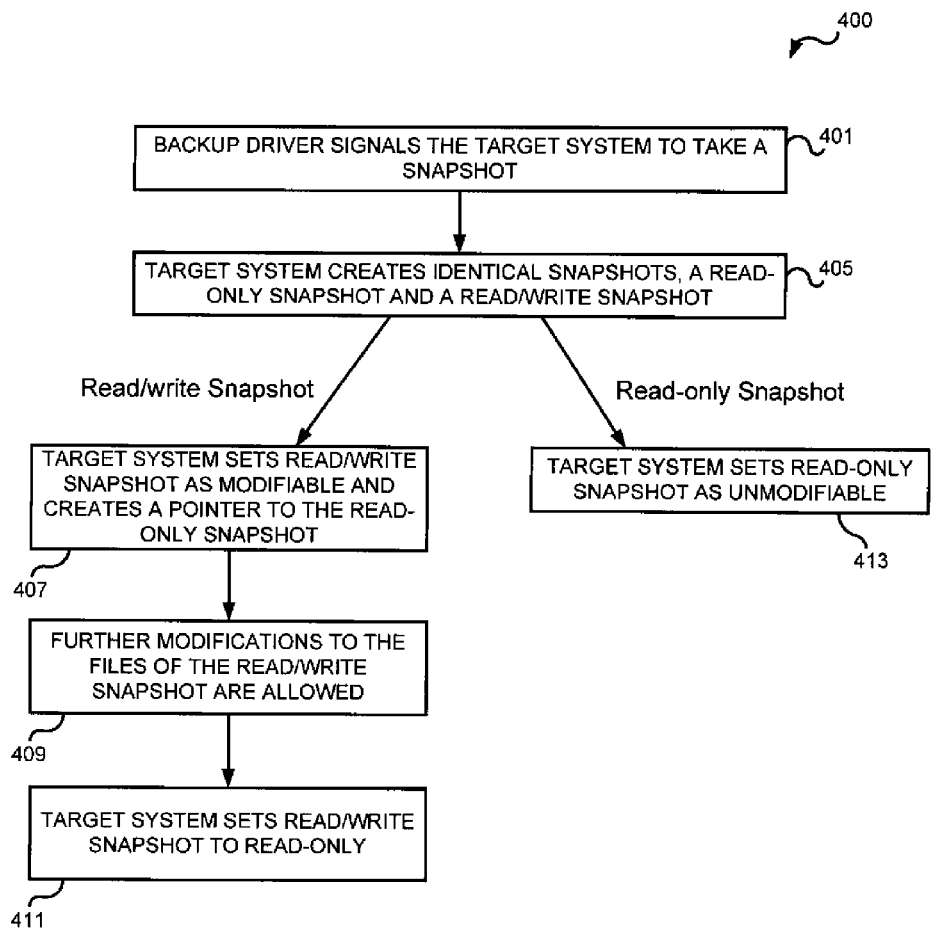
FIG. 4 shows an exemplary flow chart depicting the creation of a snapshot in accordance with an embodiment of the present disclosure.

Referring now to FIG. 4, there is shown an exemplary flow chart 400 depicting the creation of a snapshot in accordance with an embodiment of the present disclosure. Both full and incremental backup snapshots may be created according to the flow chart 400.

In block 401, the backup driver 107 signals to the target system 111 to create a snapshot of the target system 111.

In block 405, the target system 111 creates two snapshots or views of the data as it existed on target system 111 at the time the snapshots were taken, one in a read-only snapshot and one in a writable snapshot.

In block 407, the target system 111 sets a file or files that contain the writable snapshot to be writable. The writable snapshot may include a pointer to the read-only snapshot.

In block 409, further modifications to the files contained within the writable snapshot are allowed and may be performed.

In block 411, the target system 111 sets the writable snapshot to be read-only.

In block 413, the read-only snapshot created in block 405 is set to read-only, so no modifications may be made to the read-only snapshot.

Figure 5:
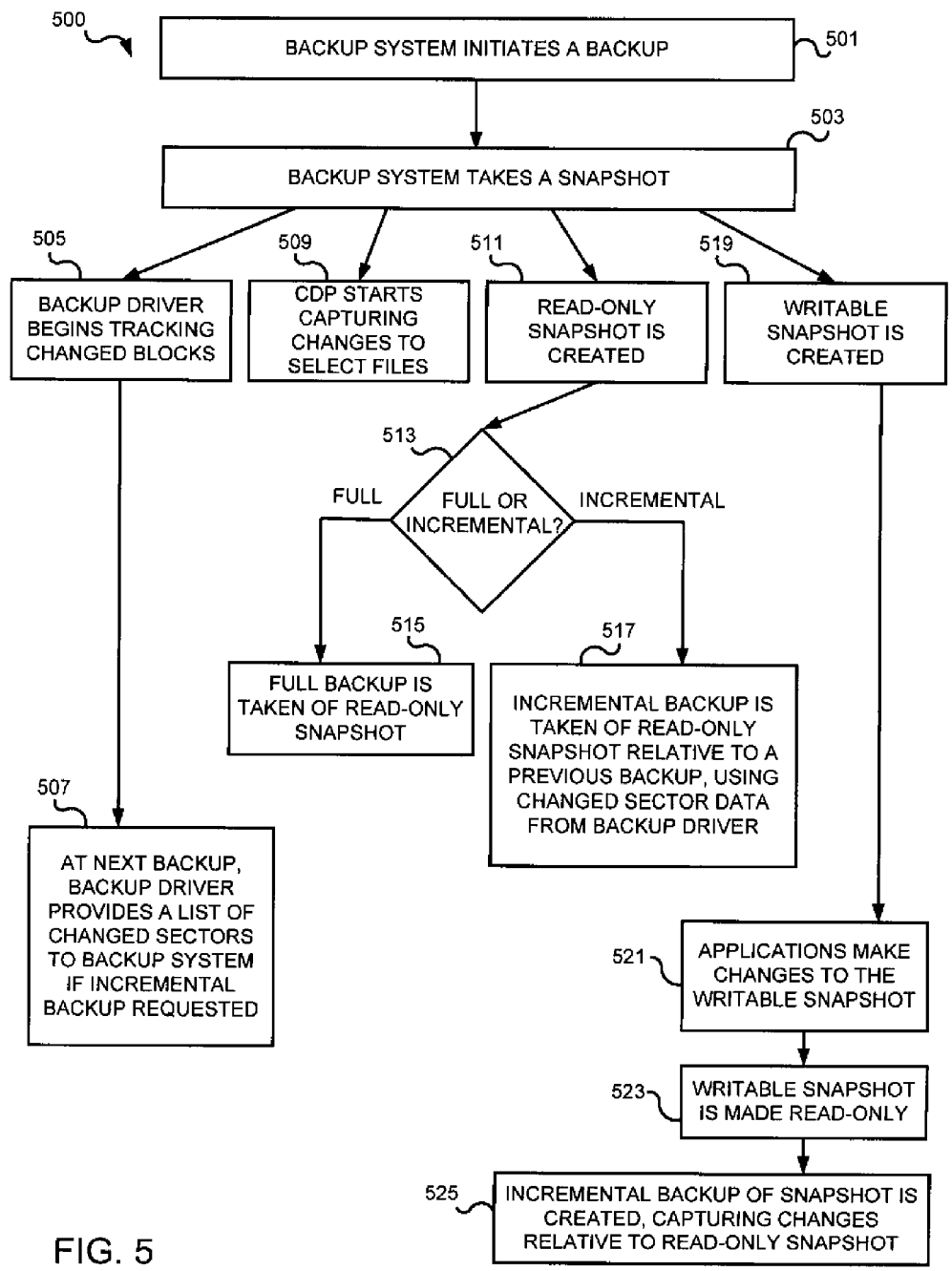
FIG. 5 shows an exemplary flow chart depicting a backup operation in accordance with an embodiment of the present disclosure.

Referring now to FIG. 5, there is shown an exemplary flow chart 500 depicting a backup operation in accordance with an embodiment of the present disclosure.

In block 501, the backup system 103 may initiate a backup. The backup may be incremental or full. Incremental or full backups may occur on a repeating schedule. For example, a full backup followed by an incremental backup, or a full backup followed by two or more incremental backups, or any other combination of full and incremental backups as may be advantageous for creating one or more restoration points for a target system 111 may occur.

In block 503, the backup system 103 may create a dual snapshot of the target system 111, or request that the backup driver create a dual snapshot.

After the backup system requests the creation of a dual snapshot, steps 505, 509, 511, and 519 may occur substantially in parallel.

At block 505, the backup driver 107 may begin to track modified blocks from the time of the initial snapshot request in block 503. The backup driver 107 may continue to monitor or track the modified blocks until the next backup is requested. At the time the next backup is requested, if an incremental backup is requested, the list of modified blocks or sectors may be provided to the backup driver or backup system in order to create an incremental backup. In an alternate embodiment, the backup driver 107 may also track the changes made to the list of modified blocks or sectors.

At block 509, a continuous data protection application or system may operate in parallel with the backup driver 107 and the backup system 103. The continuous data protection application or system may be operable to track file-level or block-level modifications to one or more of the files contained in the file system of the target system 111 and/or target system storage 113, and store the modifications to the file system in a file or files. The continuous data protection application or system may be operable to use the read-only snapshots and snapshot backups, and may have the ability to restore the file or files that it tracks to any point in time. The CDP functionality in block 509 may be implemented as part of the change tracking in block 505.

At block 511, the backup system 103 may create a read-only snapshot. The backup driver may utilize a "copy on write" operation to store old blocks or sectors of data before they are overwritten by the target system 111 in order to maintain the snapshot. At block 513, the backup system 103 or the backup driver 107 may request a full backup or an incremental backup. If the backup system 103 or backup driver 107 requests a full backup, shown in block 515, a full backup is taken of the current read-only snapshot. The full backup may reflect the current state of all or some of the files contained within the target system 111 or target system storage 113. If an incremental backup is requested, shown in block 517, the incremental modifications made to the target system 111 or the target system storage 113 are recorded. The list of modified blocks or sectors taken from blocks 505 and 507 corresponding to a previous backup may be used to create the incremental backup.

In block 519, a writable snapshot is created by the backup system or the backup driver. Applications or programs associated with the target system 111 may be operable to modify the writable snapshot, by, for example, modifying files that are contained within the writable snapshot. The writable snapshot may be made read-only, shown in block 523, after a period of time after the programs or applications associated with the target system 111 have completed modifications to the writable snapshot. In block 525, an incremental backup of the writable snapshot created in block 523 may be created. The incremental backup may only include the blocks or sectors that were modified from the read-only snapshot created in block 511, after the modification of files by the applications or programs associated with target system 111.

Another implementation may choose to create a full backup at block 525. Another implementation may choose to move block 513 after block 523 so that a full or incremental backup is created of the writable snapshot, and then the backup of the read-only snapshot created in block 511 is captured as an incremental backup relative to the backup of the writable snapshot created in block 519.

Figure 6:
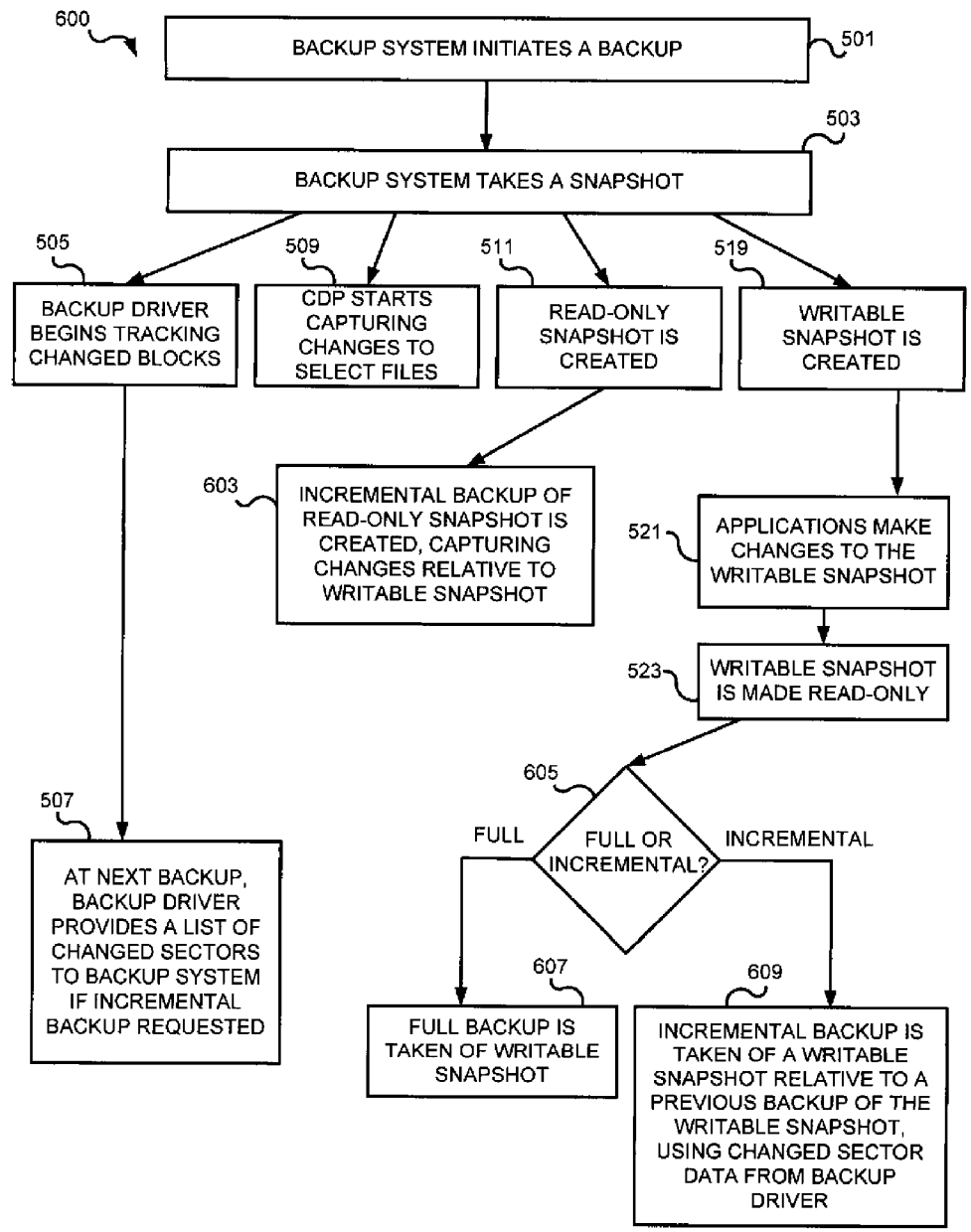
FIG. 6 shows an exemplary flow chart depicting a backup operation in accordance with another embodiment of the present disclosure.

Referring now to FIG. 6, there is shown an exemplary flow chart 600 depicting a backup operation in accordance with another embodiment of the present disclosure. The blocks with similar element numbers as depicted in FIG. 5 may have similar functionality. The distinctions between FIG. 5 and FIG. 6 may be as follows.

In block 603, an incremental backup of the read-only snapshot created in block 511 may be created. The incremental backup may only include the blocks or sectors that were modified or that are missing from the writable snapshot created in block 519, after the modification of files by the applications or programs associated with target system 111.

At block 605, the backup system 103 or the backup driver 107 may request a full backup or an incremental backup. If the backup system 103 or backup driver 107 requests a full backup, a full backup is taken of the current writable snapshot, as shown in block 607. The full backup may reflect the current state of all or some of the files contained within the target system 111 or target system storage 113. If an incremental backup is requested, the incremental modifications made to the target system 111 or the target system storage 113 are recorded, as shown in block 609. The list of modified blocks or sectors taken from blocks 505 and 507 corresponding to a previous backup may be used to create the incremental backup including changes made to the writable snapshot 519 in step 521 as well as changes made in step 521 during the previous backup. The incremental backup is thus taken of a writable snapshot relative to a previous backup of the writable snapshot, using changed sector data from the backup driver.

At this point it should be noted that a snapshot processing system in accordance with the present disclosure as described above typically involves the processing of input data and the generation of output data to some extent. This input data processing and output data generation may be implemented in hardware or software. For example, specific electronic components may be employed in a system or similar or related circuitry for implementing the functions associated with the backup driver in accordance with the present disclosure as described above. Alternatively, one or more processors operating in accordance with instructions may implement the functions associated with the backup driver in accordance with the present disclosure as described above. If such is the case, it is within the scope of the present disclosure that such instructions may be stored on one or more processor readable media (e.g., a magnetic disk or other storage medium), or transmitted to one or more processors via one or more signals embodied in one or more carrier waves.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

The invention claimed is:

1. An apparatus for creating snapshots of a target system comprising:
   a module for tracking modifications to a target system after a given time;
   a module for storing information from the target system in a first read-only snapshot and a writable snapshot;
   a module for modifying the writable snapshot after the given time;
   a module for making the modified writable snapshot a second read-only snapshot by closing the modified writable snapshot, wherein the second read-only snapshot is readable while closed, wherein the second read-only snapshot comprises either a full snapshot or an incremental snapshot provided in response to a request;
   a module for opening a third read-only snapshot to make the third read-only snapshot writeable, wherein the third read-only snapshot comprises one of the first read-only snapshot and the second read-only snapshot; and
   a restoration module configured to restore, to a time after the given time, a file out of a plurality of files of at least one of the first read-only snapshot and a backup of the first read-only snapshot.

2. The apparatus of claim 1, further comprising a module to track modifications to the writable snapshot after the given time, wherein the module to track modifications comprises a first driver, wherein the module for storing information in a snapshot comprises a second driver, and wherein the apparatus of claim further comprises a third driver for continuous data protection tracking.

3. The apparatus of claim 1, wherein the module for tracking modifications to the target system records the modifications to the target system in one or more electronic files.

4. The apparatus of claim 1, further comprising a module to create a full backup from the first read-only snapshot or the writable snapshot, wherein the full backup comprises a full backup of the target system.

5. The apparatus of claim 1, further comprising a module to create an incremental backup from the first read-only snapshot or the writable snapshot, wherein the incremental backup comprises an incremental backup of the target system relative to a backup of a previous snapshot.

6. The apparatus of claim 1, wherein the restoration module restores the target system to the state of the writable snapshot.

7. The apparatus of claim 6, wherein the restoration module uses the first read-only snapshot or a backup of the first read-only snapshot as a starting point for replaying the file system modifications captured by a continuous data protection module to reconstruct the state of a file as it existed on the target system at a time after the given time.

8. The apparatus of claim 1, further comprising a module to create an incremental backup from the first read-only snapshot or the writable snapshot, wherein the incremental backup comprises an incremental backup of the target system relative to the other snapshot created by the apparatus at the same time.

9. A method for creating snapshots of a target system comprising:
   tracking modifications to a target system after a given time;
   storing information from the target system in both a first read-only snapshot and a writable snapshot;
   modifying the writable snapshot after the given time;
   making the modified writable snapshot a second read-only snapshot by closing the modified writable snapshot, wherein the second read-only snapshot is readable while closed, and wherein the second read-only snapshot comprises either a full snapshot or an incremental snapshot provided in response to a request;
   opening a third read-only snapshot to make the third read-only snapshot writeable, wherein the third read-only snapshot comprises one of the first read-only snapshot and the second read-only snapshot; and
   restoring, using at least one computer processor, to a time after the given time, a file out of a plurality of files of at least one of the first read-only snapshot and a backup of the first read-only snapshot.

10. At least one non-transitory processor readable storage medium for storing a computer program of instructions configured to be readable by at least one processor for instructing the at least one processor to execute a computer process for performing the method as recited in claim 9.

11. The method of claim 9, wherein tracking modifications to the target system comprises recording a list of blocks modified by the target system.

12. The method of claim 11, further comprising creating an incremental backup by utilizing the list of blocks modified by the target system to determine the blocks to be captured from the writeable snapshot to comprise the incremental backup.

13. The method of claim 11, further comprising applying changes captured in one or more computer files to a backup of the first read-only snapshot to recover the one of more computer files on the target system to a point in time after the first read-only snapshot was created.

14. The method of claim 9, wherein tracking modifications to the target system comprises recording the modifications to the target system in one or more computer files.

15. The method of claim 9, further comprising storing a full backup, wherein a full backup is created from the first read-only snapshot or the writable snapshot and comprises a full backup of the target system.

16. The method of claim 9, further comprising creating an incremental backup from the first read-only snapshot or the writable snapshot, wherein the incremental backup comprises an incremental backup of the target system relative to a backup of a previous snapshot.

17. The method of claim 9, further comprising creating an incremental backup from the first read-only snapshot or the writable snapshot, wherein the incremental backup comprises an incremental backup of the target system relative to the other snapshot created by the method at the same time.

18. The method of claim 9, further comprising restoring the target system to the state of the writable snapshot, wherein restoration comprises:
   beginning restoration with a last writable snapshot backup; determining all blocks or sectors allocated at a target restoration point in time;
   checking the last writable snapshot backup for a particular allocated sector or block; and
   checking an immediately prior incremental backup for the particular allocated sector or block in the event the particular allocated sector or block is not found in the last writable snapshot backup; and
   continuing to iterate sequentially backwards through immediately prior incremental backups until the particular allocated sector or block is found or until the particular allocated sector or block is found in a full backup.

19. The method of claim 9, further comprising using the first read-only snapshot as a starting point for replaying modifications to the target system to reconstruct the state of a file as it existed on the target system sometime after the given time.

20. An article of manufacture for creating snapshots of a target system, the article of manufacture comprising:
   at least non-transitory one processor readable storage medium; and
   instructions carried on the at least one storage medium;
   wherein the instructions are configured to be readable from the at least one medium by at least one processor and thereby cause the at least one processor to operate so as to:
      track modifications to a target system after a given time;
      store information from the target system in both a first read-only snapshot and a writable snapshot;
      modify the writable snapshot after the given time; and
      make the modified writable snapshot a second read-only snapshot by closing the modified writable snapshot, wherein the second read-only snapshot is readable while closed, wherein the second read-only snapshot comprises either a full snapshot or an incremental snapshot provided in response to a request;
      open a third read-only snapshot to make the third read-only snapshot writeable, wherein the third read-only snapshot comprises one of the first read-only snapshot and the second read-only snapshot; and
      restore, to a time after the given time, a file out of a plurality of files of at least one of the first read-only snapshot and a backup of the first read-only snapshot.

* * * * *